United States Patent [19]
Jones et al.

[11] Patent Number: 4,913,961
[45] Date of Patent: Apr. 3, 1990

[54] SCANDIA-STABILIZED ZIRCONIA COATING FOR COMPOSITES

[75] Inventors: Robert L. Jones, Fairfax; Robert P. Ingel, Alexandria, both of Va.

[73] Assignee: The United States of America as represented by the Secretary of the Navy, Washington, D.C.

[21] Appl. No.: 199,815

[22] Filed: May 27, 1988

[51] Int. Cl.⁴ .............................................. B32B 9/04
[52] U.S. Cl. .................................... 428/332; 428/334; 428/472; 428/701
[58] Field of Search ....................... 428/633, 472, 332; 204/129, 426, 427, 80

[56] References Cited

U.S. PATENT DOCUMENTS

| | | | |
|---|---|---|---|
| 4,240,891 | 12/1980 | Bannister | 204/426 |
| 4,253,925 | 3/1981 | Mason | 204/129 |
| 4,328,285 | 5/1982 | Siemers | 428/633 |
| 4,659,448 | 4/1987 | Gordon | 204/427 X |
| 4,802,958 | 2/1989 | Mazanec et al. | 204/80 |

OTHER PUBLICATIONS

R. Jones, "Thermal Barrier Coatings", NASA Lewis Research Center, Cleveland, Ohio, May 21-22, 1985.
Proceedings of the First Conference on "Advanced Materials for Alternative Fuel Capable Directly Fired Heat Engines", Jul. 31-Aug. 3, 1979, Castine, ME.
Proceedings of the Second Conference on Advanced Materials for Alternative-Fuel-Capable Heat Engines, Prepared by Electric Power Res. Inst., Pal Alto, CA.
Proceedings of the 1987 Coatings for Advanced Heat Engines Workshop, Jul. 27-30, 1987, Marine Maritime Academy, Castin, Me.
Seventeen Years of Thermal Barrier Coatings, G. W. Goward, Turbine Components Corporation, pp. III-1-III-9.
Durability & Performance Testing of Ceramic Coatings in Towboat Operation, Matthew F. Winkler, Seaworthy Systems, Inc., pp. III-29-III-41.
Resistance of Thermal Barrier Ceramic Coatings to Hot Salt Corrosion, D. W. McKee et al., Gen. Electric Res. & Development Center, & J. E. Palko, General Electric Gas Turbine Products Department, Schenectady, New York 12345.
Studies of Thermal Barrier Coatings for Heat Engines, R. J. Bratton et al., Westinghouse Research and Development Center, Pittsburgh, PA 15235, Abstract.
In Situ Raman Spectroscopic Study of Yttria-Stabilized Zirconia Attack by Molten Sodium Vanadate, J. C. Hamilton and A. S. Nagelberg, Sandia National Laboratories, Livermore, CA 94550.
Hot Corrosion Studies of Zirconia Ceramics, R. L. Jones et al., Surface & Coatings Tech., vol. 32, (1987), pp. 349-358.
High Temperature Degradation of Ceramic Coatings in Environments Containing Sodium Sulfate and Sodium Vanadate, B. A. Nagaraj et al.
Reaction of Vanadium Compounds with Ceramic Oxides, R. L. Jones et al., J. Electrochemical Society, vol. 133, No. 1, Jan. 1986.
Jones "Scandia As A Corrosion-Resistant Stabilizer For Zirconia", Naval Research Laboratory, Washington, D.C., NRL Memorandum Report 6332, Sep. 8, 1988, pp. 1-22.
Jones "Hot Corrosion Resistance of Scandia Stabilized Zirconia Coatings" To be presented at First Int'l Ceramic Science & Technology Congress, Anaheim, CA Oct. 31-Nov. 2, 1989. pp. 1-28.
Ruh et al., "The System Zirconia-Scandia", J. of American Ceramic Society, vol. 60, No. 9, Sep.-Oct. 1977, pp. 399-403.

(List continued on next page.)

*Primary Examiner*—Thomas J. Herbert
*Attorney, Agent, or Firm*—Thomas E. McDonnell; A. David Spevack

[57] ABSTRACT

A scandia stabilized zirconia coating which is resistant to corrosion by sulfur and vanadium compounds at elevated temperatures. Scandia is present in the zirconia between about 4 to 8 mole percent. A composite formed from a coating of the stabilized zirconia on a substrate, such as a superalloy, is useful for turbine blades and engine pistons. Preferably, the coating is up to 10 mils thick.

17 Claims, 5 Drawing Sheets

Degrees 2 Theta

OTHER PUBLICATIONS

Andreev et al., Jr. A Crystal Growth 52 (Jan. 1981) pp. 772–776.

Bannister et al., J. of Materials Science Letter 2 (Jan. 1983) pp. 561–564.

Jones et al. (1), "Hot Corrosion Studies of Zirconia Ceramics", Surface and Coatings Technology 32 (Jan. 1987) pp. 349–358.

Jones et al. (2) "Reaction of Vanadium Compounds with Ceramic Oxides", J. of the Electrochemical Soc., vol. 133, No. 1, Jan. 1986, pp. 227–230.

Jones et al (3) "Sulfation of $CeO_2$ and $ZrO_2$ Relating to Hot Corrosion," J. of the Electrochemical Soc., vol. 132, No. 6, Jan. 1985, pp. 1498–1501.

SCANDIA-STABILIZED ZIRCONIA COATING FOR COMPOSITES

BACKGROUND OF THE INVENTION

1. Field of the Invention

This invention relates to vanadium and sulfur compound corrosion-resistant ceramic coatings. More particularly, this invention relates to scandia-stabilized zirconia coatings and composites formed with them.

2. Description of the Prior Art

As demands increase on fuel resources and as manufacturing techniques become more complex, industrial equipment is exposed to fuels and materials which contain corrosive contaminants. These corrosive contaminants can cause extensive damage to the surface and structure of industrial equipment, particularly to all types of motors, turbines, engines, furnaces, stacks, fluidized beds and the like.

In addition, it is often necessary to protect industrial parts from damage and fatigue caused by operation at high temperatures. Ceramic coatings have been used to protect exposed surfaces from heat deterioration and corrosion.

Vanadium and sulfur compounds are particularly virulent corrosive materials which are found in many fuels and raw materials. Sulfur and vanadium compounds react during combustion to produce high temperature vanadium and sulfur oxide gases within the machine or engine, and also react with sodium or sodium oxide (Na being a contaminant found in virtually all environments and ingested into the engine or machine) to deposit thin films of molten sodium vanadates and sulfates on the hot machine parts such as turbine blade or piston surfaces. It is believed that vanadium is oxidized to $V_2O_5$ in gas turbine combustion and that the sulfur compounds are present as oxides, acids and as free sulfur.

Because vanadium pentoxide ($V_2O_5$) is an acidic oxide, it reacts with $Na_2O$ (a highly basic oxide) to form a series of compounds in which the acidic nature of the compounds decreases with the $V_2O_5/Na_2O$ ratio from $Na_2V_{12}O_{31}$ (most acidic) to $Na_3VO_4$ (least acidic). Each of the acidic oxides can cause damage to machine parts. The oxides are formed as follows:

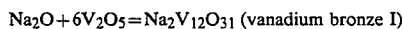
$Na_2O + 6V_2O_5 = Na_2V_{12}O_{31}$ (vanadium bronze I)

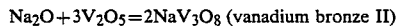
$Na_2O + 3V_2O_5 = 2NaV_3O_8$ (vanadium bronze II)

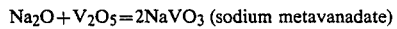
$Na_2O + V_2O_5 = 2NaVO_3$ (sodium metavanadate)

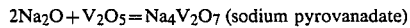
$2Na_2O + V_2O_5 = Na_4V_2O_7$ (sodium pyrovanadate)

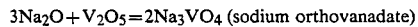
$3Na_2O + V_2O_5 = 2Na_3VO_4$ (sodium orthovanadate)

The combination of both vanadium and sulfur compounds is particularly destructive to machine parts. Rahmel, in the "Proceedings of International Conference on Ash Deposits and Corrosion Due to Impurities in Combustion Gases," Byers, Editor, p.185, Hemisphere, Washington, D.C. (1978), reports electrochemical studies of the corrosion of superalloys in molten sulfates containing different concentrations of the different vanadium compounds which indicate that the corrosiveness of the vanadium compounds decreases from $V_2O_5$ to $NaVO_3$ to $Na_3VO_4$.

With the increasing threat of an energy crisis, pulverized coal is becoming more attractive as a fuel source, but coal also contains vanadium and sulfur compounds which can destroy the insides of furnaces, including incinerators, or other combustion equipment, stacks servicing that equipment or furnaces, and the containers of fluidized beds.

Ceramic coatings have been used to try and protect surfaces from corrosion and to provide, when appropriate, a thermal barrier. Zirconia is a ceramic with excellent heat insulating properties as well as excellent resistance to corrosion by vanadium and sulfur compounds. Zirconia appears well suited to act as a protective coating to materials exposed to an atmosphere containing corrosive vanadium and sulfur compounds, but pure zirconia undergoes a catastrophic tetragonal-to-monoclinic phase structure change at 1000°–1100° C. This change results in an approximately 4% change in volume of zirconia. Such a volume change in the working parts of a machine, such as an engine, as it cycles through that temperature range is likely to result in flaking or deterioration of coatings formed from zirconia. These flakes would be calamitous to the machine.

It is known that zirconia can be stabilized to the tetragonal crystal structure by the addition of stabilizer compounds such as 5–20 wt-% of calcia (CaO), magnesia (MgO), or yttria ($Y_2O_3$). Andreev et al., J Crystal Growth, V. 52, pp. 772-776 (1981), reports using zirconia crucibles stabilized with several different oxides, including scandia, to grow semiconductor crystals. Stabilized zirconia has also been used to form reaction vessels, electrodes, and electrolytes for electrochemical reactions.

NASA and others are developing zirconia "thermal barrier" coatings for use on gas turbine blades and diesel engine pistons. These coatings are expected to substantially increase engine thermal efficiency. Siemers et al., in U.S. Pat. No. 4,328,285, describes some of the prior art attempts to coat engine parts with ceramic base materials, and Siemers teaches using cerium oxide or ceria stabilized zirconia ceramic coatings to protect turbine and engine surfaces exposed to vanadium and sulfur compound corrosion.

The zirconia thermal barrier coatings have not been completely successful because stabilized zirconia has been found to react with, and be quickly degraded by traces of sulfur, and sulfur and vanadium compounds present in many commercial and industrial grade petroleum fuels. One of the inventors, together with colleagues, has reported in R. L. Jones, C. E. Williams, and S. R. Jones, J. Electrochem. Soc. 133, 227 (1986); R. L. Jones, S. R. Jones, and C. E. Williams, J. Electrochem. Soc. 132, 1498 (1985); and R. L. Jones and C. E. Williams, Surface and Coatings Tech. 32, Nr. 1–4, 349 (1987), that the instability of the zirconia is traceable to the leaching of the stabilizer from the coating and not to the zirconia itself. A stabilizer which will not be leached from the coating on high temperature exposure to vanadium and sulfur compounds is needed before zirconia can be successfully used as a corrosion resistant coating.

SUMMARY OF THE INVENTION

Accordingly, it is an object of this invention to provide a ceramic coating which is resistant to reaction with molten vanadate and sulfate salts.

Also, it is an object of this invention to provide a stabilizer of the zirconia tetragonal structure which will not be leached at high temperatures.

In addition, it is an object of this invention to provide a stable, corrosion resistant thermal barrier for metals used in atmospheres containing molten vanadium and sulfur compounds.

Yet another object of this invention is to form composites for use in engines and other machines or facilities which are resistant to corrosion by molten vanadium and sulfate compounds.

These and other objects of the invention are accomplished by a zirconia coating stabilized with from about 4 to 8 mole-percent of scandia. The objects are also accomplished by forming a composite of up to a 30 mil coating of the scandia stabilized zirconia coated on a substrate surface.

BRIEF DESCRIPTION OF THE DRAWINGS

A more complete appreciation of the invention will be readily obtained by reference to the following Detailed Description and the accompanying drawings in which like numerals in different figures represent the same structures or elements, wherein.

DETAILED DESCRIPTION

Figure 1:
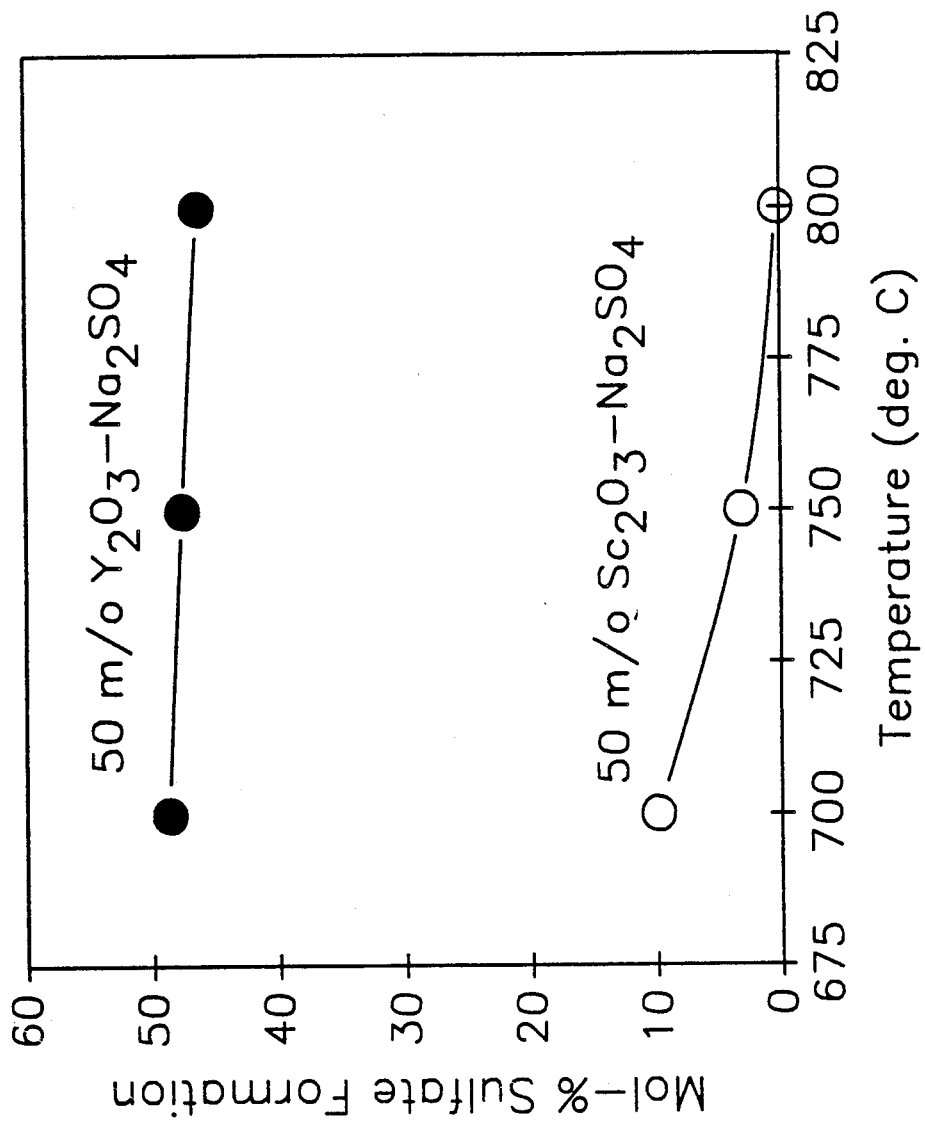
FIG. 1 is a graph comparing sulfation of $Sc_2O_3$ vs. $Y_2O_3$

The use of zirconia thermal barrier coatings has been severely limited because stabilized zirconia reacts with, and is quickly degraded by, traces of sulfur and vanadium contained in many commercial and industrial grade petroleum fuels and other combustion or high temperature environments. Zirconia itself is resistant to molten vanadate salts (Jones et al. J. Electrochem. Soc. 133, 227 (1986)) and molten sodium sulfate/sulfur trioxide (Jones et al., Metall. Trans. 16A, 303 (1985)). Principally, it is the stabilizer which is attacked. Jones et al. have shown, J. Electrochem. Soc. 133, 227 (1986), that the predominant cause of vanadate degradation of stabilized zirconia is a Lewis acid-base reaction between the yttria stabilizer and vanadium pentoxide ($V_2O_5$), the acidic component of vanadate compounds; i.e.,

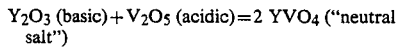

$Y_2O_3$ (basic) + $V_2O_5$ (acidic) = 2 $YVO_4$ ("neutral salt")

On the basis of this understanding proposed in the literature by Jones et al., it would be expected that an oxide of the appropriate acidic nature would give reduced reaction with the acidic corrosives $V_2O_5$ and $SO_3$. However, it has been found that the acidic nature of the stabilizing oxide is a necessary but not the only condition for resistance to sulfur and vanadium compounds. This is evidenced by the experience with ceria.

Although Ceria, $CeO_2$, described by Siemers in U.S. Pat. No. 4,328,285, is in fact a more acidic oxide than yttria (J. Electrochem. Soc. 132, 1498 (1985)) and should withstand molten sulfate and vanadate attack better than yttria, it does not. As found by Jones et al., Surface and Coatings Tech. 32, Nr. 1-4, 349 (1987), $CeO_2$ is readily leached from ceria-stabilized $ZrO_2$ by $NaVO_3$, and $CeO_2$-stabilized zirconia is degraded by $NaVO_3$ to an equal or greater extent than $Y_2O_3$-stabilized $ZrO_2$ under the same test conditions. This degradation of $CeO_2$-stabilized $ZrO_2$ has been confirmed and reported by GE scientists B. Nagaraj and D. J. Wortman, "High Temperature Degradation of Ceramic Coatings in Environments Containing Sodium Sulfate and Sodium Vanadate," presented at the 1988 International Conference on Metallurgical Coatings, 11–15 April, 1988, San Diego, Calif. (to be published).

Scandia ($Sc_2O_3$) is recognized as the most acidic rare earth oxide ("Comprehensive Inorganic Chemistry, Vol. Four", p. 168, by M. C. Sneed and R. C. Brasted, Van Nostrand, New York (1955)). Also, R. Ruh et al., reports, in Am. Ceram. Soc. 60, 399, (1977), that scandia is an effective stabilizer for zirconia in its different crystal structure forms.

Now, it has been found as part of this invention that zirconia stabilized with scandia maintains the alpha 2 prime tetragonal zirconia form and produces a ceramic coating which is resistant to corrosion from the combined or singular effects of vanadium and sulfur compounds at elevated temperatures. The required amount of scandia for this purpose is about 4 to 8 mole-percent preferably from about 4.5 to 7 mole-percent, and, most preferably, from 6 to 7 mole-percent.

Generally, the scandia stabilized zirconia ceramic is formed by combining acid solutions of scandia and a zirconium salt, neutralizing the solution to precipitate the mixed oxide ceramic precursor and recovering the precipitate. The precipitate is calcined, pressed and fired to form a dense ceramic material. The density of the ceramic can be created by isostatic pressing, hot pressing or any other means used to form ceramics.

Once formed, the stabilized zirconia ceramic is prepared in the usual manner for coating on to the substrate to be protected thus forming the composite of this invention. The support substrate can be any metal used in turbines, engines and other structures exposed to hot gases containing sulfur and vanadium compounds, or the substrate can be a ceramic such as is used in furnaces, incinerators, stacks, ceramic engines and the like. The surface of the composite is the scandia stabilized coating. The coating can be any practical thickness as is commonly used in constructing particular pieces of equipment. The coating can be as thick as ¼ inch for thermal barrier use in large diesel engines. For the purpose of achieving corrosion resistance, coatings of up to 10 mils may be used in gas turbines, with 10 mils preferred and 5 mils most preferred. Coatings for corrosion resistance barriers in other engines or applications can be as thick as 50 mils or more.

COST EFFECTIVENESS

Scandium is not a rare element, but, because it is found in very low concentration deposits, scandia is expensive. Scandia costs essentially the same as platinum (each costs approximately $20 per gram in industrial quantities at current market prices). However, despite its high cost, platinum is widely used as part of the commercially highly successful platinum-augmented aluminide coating compositions for gas turbine blades.

In these augmented aluminide coatings, a 0.2–0.4 mil thick layer of platinum is applied under an aluminide outer layer. The materials cost for platinum in such a coating is about $0.32 per cm² of coating. In contrast, the cost for $Sc_2O_3$ in a 5 mil thick coating of 5 wt-% $Sc_2O_3$-$ZrO_2$ is about $0.07 per $cm^2$. Even for a 10 mil coating the cost would only be about $0.14 per $cm^2$. The additional cost of $Sc_2O_3$ is therefore not likely to be prohibitive for many gas turbine and other applications.

For example, the first stage blade from the Navy's LM2500 gas turbines requires approximately 10 square centimeters of coating, and the extra $1-$2 cost for $Sc_2O_3$ would be quite small in relation to the total cost of the blade. The benefit of substantially longer blade life while burning lower cost, vanadium-containing fuel far exceeds the minor cost differential.

This invention can lead to large money savings in gas turbines alone. Repair, replacement and fuel costs for the Navy and nation's industrial and marine gas turbines run to hundreds of millions of dollars per year, and even small percentage improvements correspond to large dollar savings. The following specific advantages can be gained by using a thermal barrier coating in engines burning low quality, sulfur and vanadium containing fuel: increased thermal efficiency from thermal barrier coatings; longer engine component life because of reduced corrosion attack; lower cost of fuel by virtue of using lower quality fuel; increased availability of fuel; and, especially for the Navy, insurance against crippling corrosion attack on engines when burning low quality fuel under emergency conditions. Advantages would also be expected in technologies such as coal conversion, waste incineration, fuel cells, and the like, where zirconia ceramics need to be protected against attack by acidic corrosives.

Now having generally described this invention, the following examples illustrate specific application of the invention.

EXAMPLE 1

Method of Preparation

Sufficient commercial grade purity scandia ($Sc_2O_3$) to make the desired concentration (between 4 and 8 mole-%) of scandia in zirconia is dissolved in 12 molar HCl. Then, the solution is diluted to form a 3 molar HCl solution (about a 1-to-4 dilution). This solution is added to an appropriate quantity of $ZrOCl_2$ which is also dissolved in 3 Molar HCl.

The acid solution is neutralized with a stoichiometric excess amount of 3 molar $NH_4OH$. The precipitate is collected by filtration, washed several times with deionized water and dried. The precipitate is calcined for 0.5 hours at 600° C.

Pellets are formed of the precipitate by pressing the material in a uniaxial die system to 4000 psi. The pellets thus formed are then isostatically pressed to 25,000 psi to obtain a dense ceramic structure. This dense pellet is fired at 1300° C. for 3 hours. It is preferred that the pellets rest on a high purity $Al_2O_3$ substrate.

The scandia-stabilized zirconia formed by this method can be ground by known means and applied in a known manner to the substrate in need of protection. These application means include plasma spray and the like.

In some circumstances, a binder may be necessary between the substrate and the zirconia coating. Any of the known binders for zirconia coatings may be used for this purpose. Siemers, discussed above, describes one such binder or adhesive layer which may be used with this invention.

EXAMPLE 2

Comparison of Resistance of Scandia and Yttria to Sulfation

Yttria reacts readily with $SO_3$ in the presence of $Na_2SO_4$ sufficiently to cause destabilization of $Y_2O_3$-stabilized $ZrO_2$ as shown by Barkalow and F. S. Pettit, in "Proc. of the 1st Conf. on Advanced Materials for Alternative Fuel Capable Directly Fired Heat Engines," J. W. Fairbanks and J. Stringer, eds., NTIS, Springfield, Va., 1979, pp 704–14. $Sc_2O_3$ is more resistant than $Y_2O_3$ to sulfation by $Na_2SO_4$/$SO_3$.

A comparison was made by bringing 50 mole-% mixtures of $Sc_2O_3$-$Na_2SO_4$ and $Y_2O_3$-$Na_2SO_4$ to equilibrium under air containing 12.5 pa (125 ppm) of $SO_x$ ($SO_x = SO_2 + SO_3$) at temperatures over a range of 700°–800° C. The partial pressure of 12.5 Pa of $SO_x$, (which corresponds to approximately 7 Pa of $SO_3$ at 700° C. and 5 Pa of $SO_3$ at 800° C.), was chosen as being representative of $SO_x$ concentrations that might be encountered in engines.

As shown in FIG. 1, $Y_2O_3$ is essentially converted completely to sulfate even at 800° C. (46.3 mole-% sulfate formation, 93% conversion), while $Sc_2O_3$ gives only 9.9 mole-% sulfate formation (20% conversion) at 700° C., which diminishes to 0.3 mole-% (0.6% conversion) at 800° C. These results confirm that $Sc_2O_3$ is a significantly more acidic oxide than $Y_2O_3$, and that $Sc_2O_3$-stabilized $ZrO_2$ is more resistant to degradation via a sulfation mechanism than $Y_2O_3$-stabilized $ZrO_2$, especially above 800° C. (gas turbine blades are usually above this temperature except in low power running) where $Sc_2O_3$ sulfation would not be expected.

EXAMPLE 3

Comparison of Scandia and Yttria to Vanadium Compounds

Vanadate Reaction. Experimentally we have demonstrated that $Y_2O_3$ reacts with $NaVO_3$ at both 700° C. and 900° C., forming $YVO_4$ in each case. On the other hand, $Sc_2O_3$ does not react with $NaVO_3$ at 900° C., but did form some $ScVO_4$ at 700° C. These results indicate that $Sc_2O_3$ is less reactive with $NaVO_3$ than $Y_2O_3$, and while there is some reaction at 700° C., the compound produced, $ScVO_4$, is unstable at higher temperatures and will break down to the original components. Scandia-stabilized zirconia is therefore less likely to undergo vanadic attack by a vanadate formation mechanism, especially at the high temperatures of an operating turbine blade, than is yttria-stabilized zirconia, where yttrium vanadate forms readily to 900° C. and beyond.

EXAMPLE 4

Molten $NaVO_3$

Reaction of $NaVO_3$ with 5 wt-% $Sc_2O_3$-$ZrO_2$ vs 8 wt-% $Y_2O_3$-$ZrO_2$.

Figure 2:
FIG. 2 is a photograph showing $YVO_4$ crystals resulting from attack of $NaVO_3$ on a yttria stabilized zirconia.

A ceramic pellet of 5 wt-% (4.5 mole-%) $Sc_2O_3$ in $ZrO_2$, and a ceramic pellet of 8 wt-% (4.5 mole-%) $Y_2O_3$ in $ZrO_2$, were prepared using the methods of preparation described in Example 1. Each of these pellets was deposited together with 5–10 mg of $NaVO_3$ (corresponding to 10–20 mg/$cm^2$) in a vessel and exposed in furnaces at both 700° C. and 900° C. Results from a 475 hour test conducted at 700° C. are shown in FIG. 2 for 8 wt-% $Y_2O_3$-$ZrO_2$. Results for 5 wt-% $Sc_2O_3$-$ZrO_2$ are shown in FIG. 3.

The photograph, FIG. 2, shows that the $NaVO_3$ has quickly and completely reacted with the $Y_2O_3$-$ZrO_2$ leaving numerous acicular $YVO_4$ crystallites on the zirconia surface. The surface is depleted of $Y_2O_3$ and destabilized to the monoclinic structure.

Figure 3:
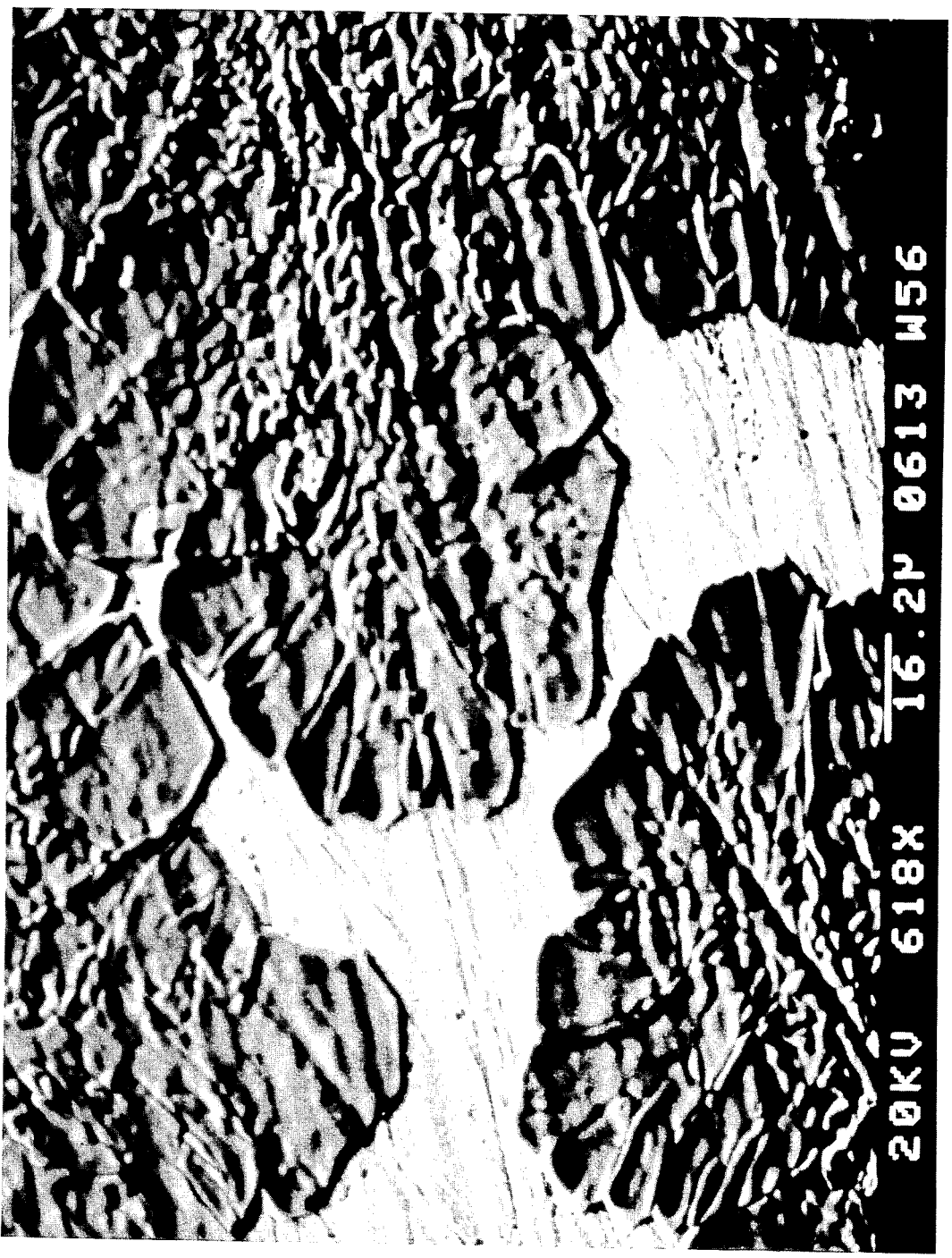
FIG. 3 is a photograph showing non-reaction of $NaVO_3$ on a scandia stabilized zirconia.

In contrast, as is seen in FIG. 3, even after exposure for 475 hours, the $NaVO_3$ phase exists on the $Sc_2O_3$-$ZrO_2$ surface with little reaction appearing to have occurred between $NaVO_3$ and $Sc_2O_3$-$ZrO_2$. However, detailed analysis shows that some reaction has taken place forming, within the $NaVO_3$ film, a limited amount of a phase which contains scandium, calcium (an impurity from either the ceramic or $NaVO_3$), zirconium, and vanadium. If the $NaVO_3$ film is washed off, x-ray diffraction reveals that the outer surface now contains some monoclinic phase; i.e., that sufficient $Sc_2O_3$ has been removed to allow partial destabilization of the outermost region of the ceramic. However, the amount of reaction and destabilization is significantly less than observed with $Y_2O_3$-$ZrO_2$. Thus, the experiment at 700° C. clearly demonstrates the superiority of $Sc_2O_3$-$ZrO_2$ over $Y_2O_3$-$ZrO_2$ in resistance to molten vanadate corrosion.

The experiments with molten $NaVO_3$ deposits at 900° C. gave similar results, except that the $NaVO_3$ film, although still much less reactive with $Sc_2O_3$-$ZrO_2$ than with $Y_2O_3$-$ZrO_2$, did not persist as long on the $Sc_2O_3$-$ZrO_2$ surface at 900° C. as at 700° C.

EXAMPLE 5

Exposure to Vanadate Vapor

Vaporous $NaVO_3$ Reaction with 5 wt-% $Sc_2O_3$-$ZrO_2$ vs 8 wt-% $Y_2O_3$-$ZrO_2$. Molten salt deposits occurring in engines are normally very thin containing on the order of 1 mg/cm$^2$ or less of material rather than the 10-20 mg/cm$^2$ of material used in the preceding examples.

Figure 4:
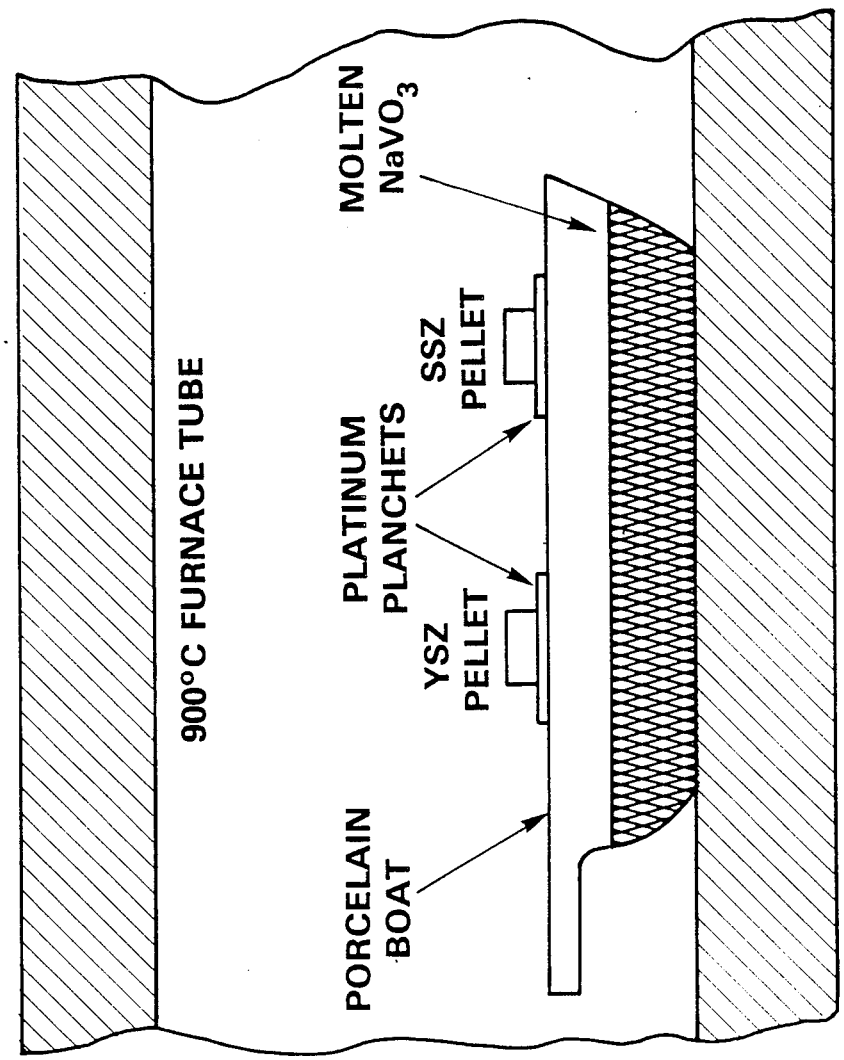
FIG. 4 is a schematic drawing of a test apparatus for corrosive vapor testing.

In engines, incinerators, furnaces or the like much of the corrosion will involve vaporous corrosives. To test reaction to corrosive vapor, experiments were conducted at 900° C. using the arrangement illustrated in FIG. 4. The $NaVO_3$ melt was contained in a porcelain crucible, and the $Sc_2O_3$-$ZrO_2$ and $Y_2O_3$-$ZrO_2$ pellets were placed in a platinum planchet resting on top of the boat but not touching the $NaVO_3$ melt so that only predominantly vaporous species of $NaVO_3$ (and possibly some $V_2O_5$ resulting from $NaVO_3$ reaction with the porcelain boat) came in contact with the ceramic pellets. In addition to providing a more realistic test, this arrangement helps avoid artifacts involved with the use of thick molten phase deposits, such as the suspected calcium contamination problem and the possibility that stabilizer depletion may occur by simple physical dissolution into the molten vanadate layer, rather than actual chemical reaction between $NaVO_3$ and stabilizer.

Figure 5:
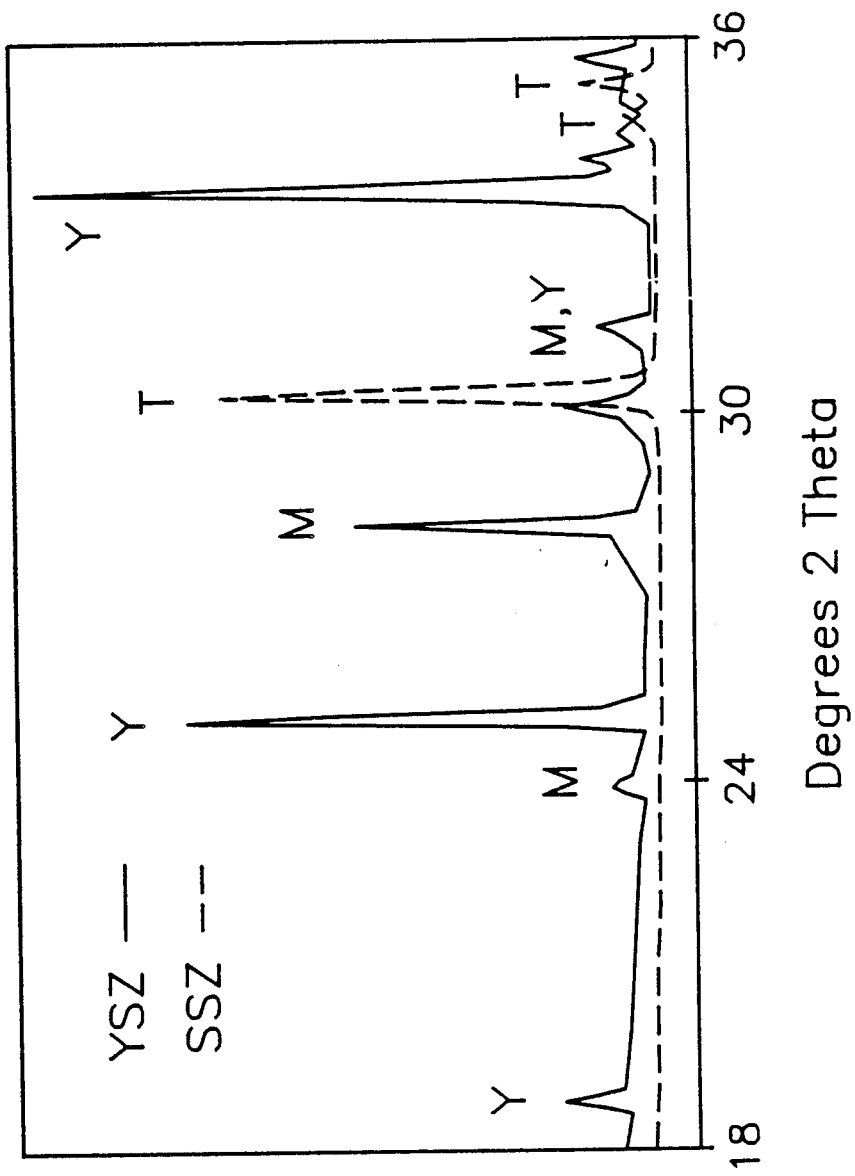
FIG. 5 is a composite plot of the X-ray spectra comparing scandia stabilized zirconia to yttria stabilized zirconia after exposure to $NaVO_3$ at 900° C.

The 900° C. vapor phase experiments proved to be excellent discriminatory tests, and provide further clear evidence that $Sc_2O_3$-$ZrO_2$ is more resistant to vanadic attack than $Y_2O_3$-$ZrO_2$. As shown by the solid line in FIG. 5, X-ray diffraction of the $Y_2O_3$-$ZrO_2$ surface of pellets exposed 119 hours shows conclusively that $YVO_4$ has been formed and that substantial destabilization to the monoclinic phase has occured. In FIG. 5, "Y" denotes the $YVO_4$ peaks, "M" denotes monoclinic zirconia peaks, and "T" denotes tetragonal zirconia peaks. FIG. 5 also shows by a dashed line the X-ray diffraction of $Sc_2O_3$-$ZrO_2$ exposed in the same test. It is clear that the scandia stabilized zirconia remains entirely in the tetragonal structure. There is no indication at all of vanadic reaction.

Obviously, many modifications and variations of the present invention are possible in light of the above teachings. It is therefore to be understood that within the scope of the appended claims, the invention may be practiced otherwise than as specifically described.

What we claim is:

1. A composite structure comprising a substrate and a protective coating of scandia stabilized zirconia on said substrate, said coating of scandia stabilized zirconia having an outer surface which is exposed to, and resistant to corrosion by, sodium vanadates and sodium sulfates under combustion conditions.

2. A composite structure according to claim 1 wherein the substrate is a metal.

3. A composite structure according to claim 1 wherein the substrate is a ceramic.

4. A composite structure according to claim 1, further comprising deposits of a sodium vanadate upon said exposed outer surface.

5. A composite structure according to claim 1, further comprising deposits of a sodium vanadate upon said exposed outer surface, said deposits having been formed from a molten sodium vanadate.

6. A composite structure according to claim 1 wherein the layer is up to about 50 mils thick.

7. A composite structure according to claim 6 wherein the layer is up to about 10 mils thick.

8. A composite structure according to claim 7 wherein the layer is about 5 mils thick.

9. A composite structure according to claim 1 wherein the layer contains about 4 to 8 mole-percent scandia.

10. A composite structure according to claim 9 wherein the layer contains about 4.5 to 7 mole-percent scandia.

11. A composite structure according to claim 10 wherein the layer contains about 6 to 7 mole-percent scandia.

12. A composite structure according to claim 10 wherein the substrate is a metal.

13. A composite structure according to claim 10 wherein the substrate is a ceramic.

14. A composite structure according to claim 10 wherein the layer is up to about 10 mils thick.

15. A composite structure according to claim 14 wherein the substrate is a metal.

16. A composite structure according to claim 14 wherein the layer is about 10 mils thick.

17. A composite structure according to claim 16 wherein the substrate is a metal.

* * * * *